Patented Nov. 30, 1943

2,335,645

UNITED STATES PATENT OFFICE 2,335,645

VARIABLE CRANK GEAR

Orlando Celio, Soleure, Switzerland, assignor to Scintilla Ltd., Soleure, Switzerland, a corporation of Switzerland Application April 2, 1942, Serial No. 437,453
In Switzerland December 8, 1941

4 Claims. (Cl. 74—571)

The invention relates to a variable crank gear carrying on its shaft an adjustable unsymmetrical member for varying the radial lever arm or throw of the crank as well as its angle of lead or lag with respect to said shaft.

In known crank gears of this type, the adjustable member on the crank shaft is operated mechanically by rods or the like whose displacements are transformed through a quick pitch thread coupling into rotatory movement of a member concentric with said shaft, and rotation of said concentric member is then transmitted by another coupling upon the adjustable member which is eccentrically disposed with respect to the shaft. Such operating devices are of complicated construction, and their parts are subjected to great wear due to shocks and jars that are customary in almost every crank drive. Moreover, the precise adjustment of the crank operated in this way is affected by the clearance which has to be provided between stationary and movable parts in the couplings and connections of the operating device. Crank gears employed for the operation of big engines also require a high adjusting power for the setting of the adjustable member which power cannot be transmitted economically by mechanical means.

The object of the present invention is to avoid these inconveniences and to simplify the construction of variable crank gears as well as the means and mode of adjustment of the variable crank throw and its angle of lead or lag with respect to the driving crank shaft. In particular, it is intended to devise a variable crank of improved construction which while in action or at rest may be subjected to continuous adjustment.

According to the invention, adjustment of the crank is effected hydraulically by subjecting the adjustable member on the crank shaft to the continuous action of pressure fluid which is controlled by a hand or automatically operated distributing valve. Preferably, an inner eccentric is formed integral with or fast on the crank shaft, and the adjustable member is provided in the form of an outer eccentric which is angularly displaceable on said inner eccentric under the action of pressure fluid.

Further according to the invention a preferred arrangement is one in which the inner eccentric is provided on its outer working surface with a peripheral groove, preferably of semi-circular transverse formation, for engagement with a correspondingly shaped radial tongue formed on the adjustable outer eccentric so as to be slidable in said groove with a tight fit. A part of said groove is filled up with a segment block secured to the inner eccentric while the remaining free space of the groove is divided by said tongue into two pressure chambers communicating with a pressure fluid supply. The angular displacement of the outer eccentric is guided, on the one side, by the inner working surface thereof sliding on the outer peripheral bearing surface of the filling block and, on the other side, by the tongue reciprocating in the groove of the inner eccentric opposite said working surface, said displacement being limited in both directions by stops provided on said block for cooperating with said tongue. The groove on the inner eccentric is accessible through a lateral slot provided in the body of said eccentric adjacent one end of the filling block so as to permit of entering the tongue of the outer eccentric into said groove.

The inner and outer eccentric are sealed laterally by at least one disk seated on the crank shaft against that face of the inner eccentric wherein is arranged the lateral slot, said disk being provided with a projection conforming to and fitting into said slot for tightly closing the same and for securing said disk to the inner eccentric with which it is to be rotated.

The pressure chambers formed in the groove on either side of the tongue of the outer eccentric communicate through channels arranged in the crank shaft with two supply pipes leading to the distributing valve. The control of said valve is subjected to the operation of a hand wheel and to the return movement of an automatic compensation mechanism which may be actuated directly by the adjustable outer eccentric. The angular displacement of the latter is transmitted to a concentric member freely revoluble on the crank shaft and having a quick pitch thread engagement with a concentric ring which is axially displaceable along guide pins fast with the inner eccentric and whose displacement is operative to return a sliding sleeve of the distributing valve into a median position of said valve.

As will be appreciated, this improved construction of the crank gear and the new mode of its adjustment is marked by a high measure of simplicity and it is found in actual use to be exceedingly effective. It is also relatively inexpensive to produce and it lends itself to neat and attractive design.

The invention will now be further described with reference to the accompanying drawings, which illustrate a preferred embodiment thereof by way of example.

In these drawings:

Fig. 3 is a cross sectional view taken on the line A—A in Fig. 2.

Fig. 4 is a cross sectional view taken on the line B—B in Fig. 3, and Fig. 5 is a cross sectional view taken on the line C—C in Fig. 2.

Figure 1:
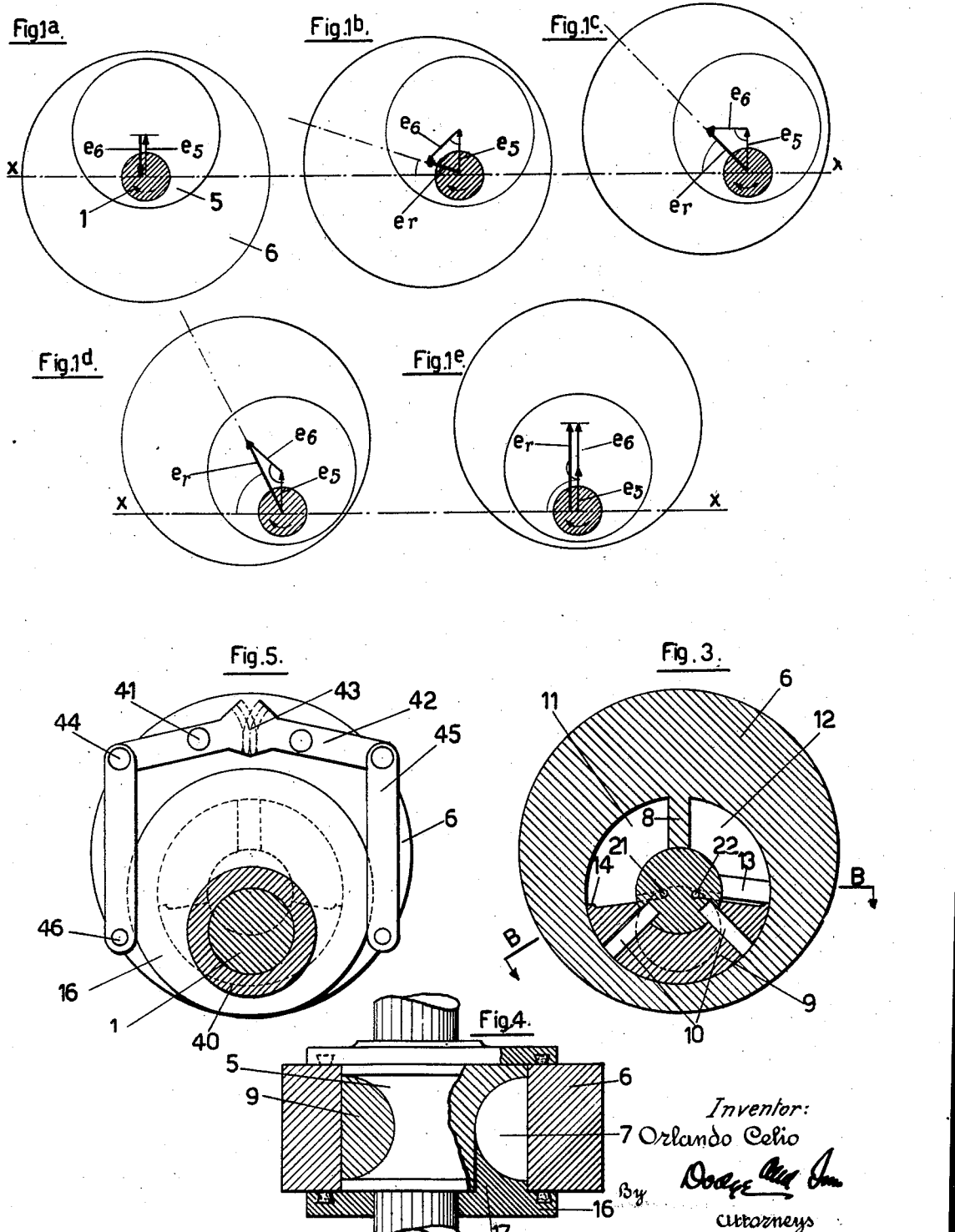
Figs. 1a to 1e are diagrams illustrating different working positions of a variable crank gear according to the invention.

In the construction illustrated, the shaft 1 of a variable crank gear is supported in bearings 2 and 3 of a machine casing 4 and may be driven at one of its ends with constant speed for example. The crank gear which may be of any type, is herein shown formed with eccentrics comprising an inner eccentric 5 integral with or fast on the shaft 1 and carrying an unsymmetrical member or outer eccentric 6 which is freely rotatable on said inner eccentric so as to permit of varying the radial lever arm or throw of the crank as well as its angle of lead or lag with respect to the driving crank shaft 1. This adjustment is illustrated most clearly by establishing diagrams for different positions of the crank as shown in Figures 1a to 1e. In these figures, $x$ indicates the momentary angular position of the crank shaft 1 which may be turning in the direction of the arrow; $e_5$ is the eccentricity of the inner eccentric 5, $e_6$ the eccentricity of the adjustable outer eccentric 6, and $e_r$ is the resultant eccentricity or radial lever arm of the crank. In the present instance, the eccentricities $e_5$ and $e_6$ are of equal length. Fig. 1a shows the zero position of the crank; the eccentricities $e_5$ and $e_6$ are opposed to each other, and the radial lever arm and its angle of lead relative to the axis $x$ are at zero. In Fig. 1b, the adjustable outer eccentric 6 has been turned through an angle of 45° in clockwise direction, and the radial lever arm of the crank is represented by the vector $e_r$ which leads the axis by 22½°. In Figs. 1c and 1d, the outer eccentric 6 has been turned farther in the same direction through angles of 90° and 135°, respectively, whereby the radial lever arm of the crank is successively increased and leads the axis $x$ by 45° and 67½° as shown. Fig. 1e illustrates the end position of the crank, the outer eccentric 6 having been turned through 180°, and the radial lever arm $e_r$ being increased to the maximum length ($e_5+e_6$) and set 90° with respect to the momentary angular position $x$ of the crank shaft 1. On turning the adjustable outer eccentric 6 from the zero position of Fig. 1a in counter-clockwise direction, the radial lever arm or throw of the crank increases in the same way inducing simultaneously a corresponding time lag of said throw with respect to the momentary angular position of the shaft.

Variable crank gears of this class are used, for instance, for the operation of valve controlled piston engines. For this purpose, the adjustable member or outer eccentric of the crank gear is operatively connected with the working piston of the engine, and the crank shaft carries also a revoluble control eccentric for the slide-valve which eccentric has its eccentricity axis set 90° with the resultant eccentricity of the variable crank gear and is coupled for adjustment with the adjustable member thereof for adapting the moments of operation of the slide-valve to the varying times of the beginning and end of the piston stroke. The connection and operation of such crank gears are disclosed in my copending application Ser. No. 435,574 filed March 20, 1942, and, therefore, need not be further described herein.

According to the invention, adjustment of the variable crank rear is operated hydraulically, the outer and inner eccentric being capable of relative angular sliding movement under the action of pressure fluid which is controlled by a hand or automatically operated distributing valve.

To this end, the inner eccentric 5 is shown having on its outer working surface a peripheral groove 7, preferably of semi-circular transverse formation, for engagement with a correspondingly shaped radial tongue 8 formed on the adjustable outer eccentric 6 so as to be slidable in said groove with a tight fit. A part of the groove 7 is filled up with a segment block 9 which is secured to the inner eccentric 5 by means of taper pins 10 (Fig. 3), and the remaining free space of said groove is divided by the tongue 8 of the outer eccentric into two pressure chambers 11 and 12. The groove 7 on the inner eccentric is accessible through a lateral slot 13 provided in the body of said eccentric adjacent one end of the block 9 so as to permit of entering the tongue 8 of the outer eccentric into said groove.

The relative angular displacement of the outer eccentric 6 is guided, on the one side, by the inner working surface thereof sliding on the outer peripheral bearing surface of the filling block 9 and, on the other side, by the tongue 8 reciprocating in the groove 7 of the inner eccentric opposite said working surface, said displacement being limited in both directions by stops 14 provided on the filling block for cooperating with said tongue.

Both the eccentrics 5 and 6 are sealed laterally by a collar 15 fast on the inner eccentric 5 and a cover disk 16 which is freely mounted on the shaft 1. The said disk is preferably seated against that face of the inner eccentric 5 wherein is arranged the lateral slot 13, and it is formed with a projection 17 conforming to and fitting into said slot so as to tightly close the same and also to secure said disk to the inner eccentric with which it is to be rotated. 18 and 19 are annular packings inserted into the collar 15 and the disk 16, respectively, to improve the sealing effect on the contacting area between said parts and the outer eccentric 6.

The pressure chambers 11 and 12 formed in the groove 7 on either side of the tongue 8 of the outer eccentric communicate through channels 21 and 22 arranged in the shaft 1 with two supply pipes 31 and 32 leading to the distributing valve S. In the present instance, the connection of the channels 21 and 22 to said pipes is effected by means of carbon fittings adapted to seal the shaft externally. Said fittings are shown comprising each a stationary casing 20 having annular grooves for suitably accommodating two-part carbon packings 23 which may be rotatable in said grooves and pressed against the shaft 1 by spiral springs 24. The pipes 31 and 32 are secured to the casings 20 and communicate each through a radial bore 25 in said casings with an annular pressure space 26 formed on the shaft between two adjacent carbon packings. From said pressure spaces are started the channels 21 and 22 which issue into the pressure chambers 11 and 12 adjacent the two ends of the filling block 9.

Figure 2:
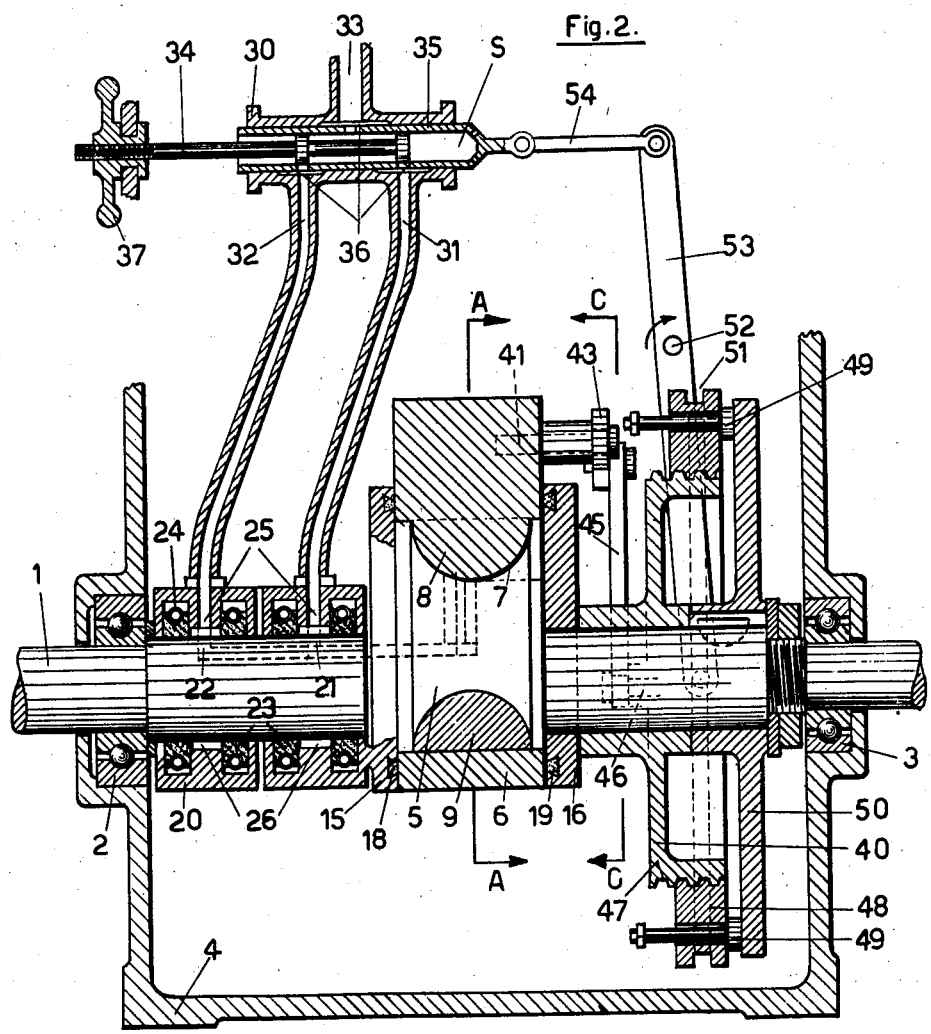
Fig. 2 is an axial sectional view of the crank gear showing the constructional features thereof and the means provided for its adjustment.

The distributing valve S is shown composed of a stationary chest 30 presenting an inlet 33 through which pressure fluid may be supplied by a pump or like means not represented, and outlets having secured thereto the supply pipes 31 and 32. The operating organ 34 of the valve which organ is constructed in the form of a double piston reciprocates with a tight fit in a sleeve 35 which is itself slidably fitted in the chest 30 and provided with cross-bores which in the median position of the sleeve are brought into register with the inlet and outlet passages in the chest 30 as shown in Fig. 2. The said passages are enlarged on the inner wall of the chest 30 to form oblong grooves 36 which communicate at all times with the cross bores in the sliding sleeve 35 whatever the momentary position of said sleeve.

The double piston 34 of the distributing valve is subjected to determine displacements operated by the attendant either directly or through any intermediate means, or in some cases it may be actuated automatically in response to movements of the engine to which the adjustable crank is applied. In the present example, operation of the valve is effected by a hand wheel 37. According to the position of the double piston 34, pressure fluid is admitted to one of the chambers 11 or 12 in the inner eccentric 5. When the double piston is displaced for instance to the right by the hand wheel 37, pressure fluid can flow through pipe 31 and channel 21 into the chamber 11 while, simultaneously, fluid from the chamber 12 is allowed to escape through channel 22 and pipe 32. The excessive pressure thus produced in the chamber 11 is active in displacing the tongue 8 and therewith the outer eccentric 6 in clockwise direction. Reverse movements take place upon displacing the double piston 34 of the valve to the left.

In order to permit an accurate adjustment of the crank, the hydraulic control device thereof is equipped also with an automatic compensation mechanism as is the case, generally, with such types of control devices. The said compensation mechanism may be actuated directly by the adjustable outer eccentric 6 through the intermediary of a concentric member 40 which is freely mounted on the shaft 1 for the coupling of said adjustable eccentric with the crank of the slide-valve of the engine not represented in the drawings. As shown in Fig. 2, the concentric member 40 is coupled for rotation with the adjustable outer eccentric 6. The latter carries, for this purpose, on the side facing the member 40 two pivot pins 41 which are parallel to the shaft and equally spaced from the eccentricity axis of said eccentric on either side thereof. Upon each of said pins is rockingly mounted a lever 42 which is provided at one end with a toothing 43 which toothings are shown meshing with each other along pitch circle arcs of equal radius having their centers in the pivots 41. The other ends of the levers 42 carry pins 44 upon which are applied links 45 of equal length, said links being pivoted to diametrically opposite pins 46 fast on the concentric member 40.

The concentric member 40 is shown carrying an external quick pitch screw thread 47 so as to co-operate with the complementary thread carried by a ring 48 concentric with and surrounding the member 40. The said ring is axially displaceable along guide pins 49 inserted with a press fit into a disk 50 keyed to the shaft 1 so as to revolve in unison with the inner eccentric 5 on said shaft, and it presents an outer annular groove 51 adapted for engagement with a fork shaped end of a lever 53 pivoted as at 52. The other end of said lever is connected by the intermediary of a rod 54 with the sliding sleeve 35 of the distributing valve S.

The operation of the compensating mechanism is the following:

When on displacing the double piston 34 of the valve to the right pressure fluid is admitted through pipe 31 and channel 21 into the pressure chamber 11 of the inner eccentric 5, the outer eccentric 6 is turned in clockwise direction through a determined angle, and such rotation is transmitted by the lever and link mechanism 41—46 upon the concentric member 40 which by reason of the quick pitch thread 47 causes the ring 48 to travel axially on the guide pins 49. Supposing, the displacement of ring 48 be effected to the left, the lever 53 is rocked about its pivot axis 52 in the direction of the arrow and thereby acts upon the rod 54 to displace the same together with the sliding sleeve 35 of the valve to the right into a medium position of said sleeve wherein the cross bores of the latter are again opposite the two working surfaces of the double piston 34, so as to interrupt further pressure fluid supply into the chamber 11 of the inner eccentric 5.

It will be seen from the foregoing that, on turning the hand wheel 37, always a complete operating cycle including an angular displacement of the outer eccentric 6 by pressure fluid and a subsequent interruption of fluid supply takes place, the equilibrium being attained when the sliding sleeve 35 has retaken its median position with respect to the double piston 34. During such cycles, communication between the cross bores in said sleeve and the inlet and outlet passages of the valve is maintained at all times through the oblong grooves 36 in the valve chest 30.

The invention is not limited to the example above described as subordinate details of the operating device of the adjustable crank may be varied to suit requirements. Thus, to vary the radial lever arm and the angle thereof with respect to the driving crank shaft within large limits, the filling block 9 could be reduced in size to form but a small intermediate wall between the two pressure chambers 11 and 12 in the peripheral groove 7 of the inner eccentric. Also the tongue 8 sliding with a tight fit in said groove could be disposed on the narrow side of the outer eccentric. Moreover, sealing of the eccentrics 5 and 6 could be effected in other ways than those shown, and for the connection of the channels 21, 22 to the pipes 31, 32 any suitable joint different from the carbon fittings shown could be employed.

What is claimed and desired to be secured by Letters Patent is:

1. A variable throw crank mechanism comprising a rotary shaft, an eccentric mounted thereon to rotate relatively thereto, such rotation varying at least the angular position of the eccentric relatively to the shaft; an expansible chamber motor turning with the shaft and reacting between the shaft and said eccentric, said motor having opposed working spaces to and from which alternately pressure fluid may be admitted and exhausted to control the angular position of the eccentric; port connections leading to respective working spaces of the motor; a motion transmitting member swiveled on said shaft and having a quick pitch thread; a positive mechanical connection between said motion transmitting member and said eccentric so arranged as to cause them to rotate in unison relatively to the shaft; a second motion transmitting member engaging the quick pitch threads on the first motion transmitting member; means serving to guide the second motion transmitting member in the direction of the axis of the shaft while constraining it to rotate therewith; a connection for supplying fluid under pressure; a distributing valve mechanism of the admission and exhaust type supplied by said connection controlling both said port connections and adapted to connect either thereof to supply and the other simultaneously to exhaust, said valve comprising independently shiftable components, one of which is a ported valve seat and the other of which is a valve controlling the ports in said seat; a follow-up connection between one of said components and the second motion transmitting member; and means for adjusting the position of the other valve component.

2. The combination defined in claim 1 in which the distributing valve mechanism is mounted in a fixed housing and the port connections are formed in the shaft and communicate with said housing through swivel connections, and the follow-up connection between the second motion transmitting member and one of the valve components includes a sliding follower permitting rotation of the motion transmitting member.

3. A variable throw crank mechanism comprising a rotary shaft provided with an eccentric journal; a second journal member eccentrically mounted on the first named eccentric journal whereby rotation of the second journal member on the first varies the angular position and the eccentricity of the second journal relatively to the shaft; an expansible chamber motor turning with the shaft and reacting between the shaft and the second journal member, said motor having opposed working spaces to and from which alternately pressure fluid may be admitted and exhausted to control the position of the second journal member; port connections leading to respective working spaces of the motor; a motion transmitting member swiveled on said shaft and having a quick pitch thread; a positive mechanical connection between said motion transmitting member and the second journal member so arranged as to cause them to rotate in unison relatively to the shaft; a second motion transmitting member engaging the quick pitch threads on the first motion transmitting member; means serving to guide the second motion transmitting member in the direction of the axis of the shaft while constraining it to rotate therewith; a connection for supplying fluid under pressure; a distributing valve mechanism of the admission and exhaust type supplied by said connection controlling both said port connections and adapted to connect either thereof to supply and the other simultaneously to exhaust, said valve comprising independently shiftable components, one of which is a ported valve seat and the other of which is a valve controlling the ports in said seat; a follow-up connection between one of said components and the second motion transmitting member; and means for adjusting the position of the other valve component.

4. The combination defined in claim 3 in which the distributing valve mechanism is mounted in a fixed housing and the port connections are formed in the shaft and communicate with said housing through swivel connections, and the follow-up connection between the second motion transmitting member and one of the valve components includes a sliding follower permitting rotation of the motion transmitting member.

ORLANDO CELIO.